Figure 1:
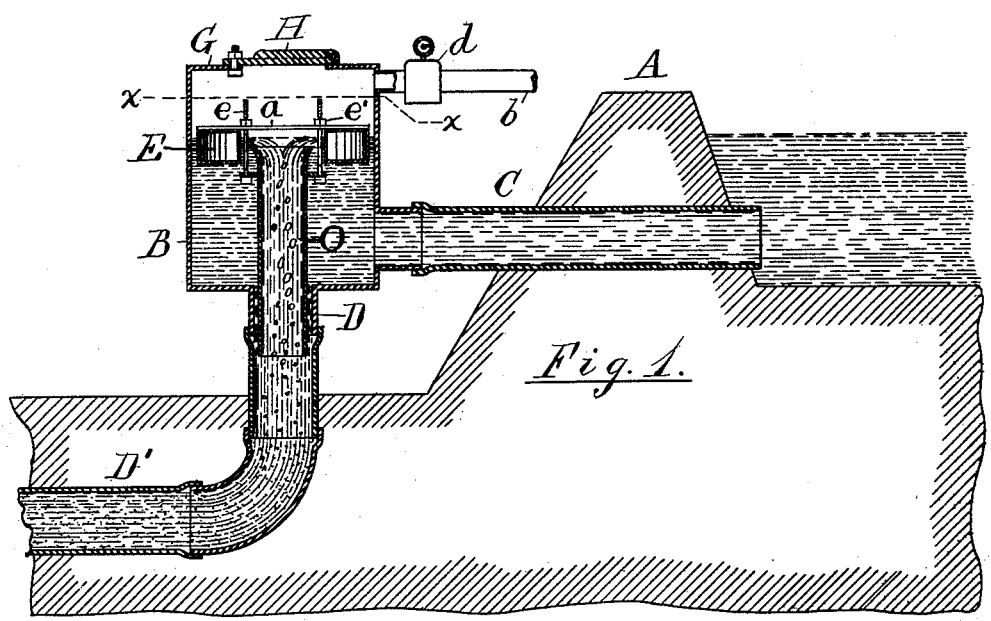

(No Model.) 3 Sheets—Sheet 1.

J. W. HYATT.
AERATION IN AQUEDUCTS.

No. 360,593. Patented Apr. 5, 1887.

Attest:
L. Lee.
Henry J. Theberath.

Inventor:
John W. Hyatt, per
Crane & Miller, Attys.

(No Model.) 3 Sheets—Sheet 2.

J. W. HYATT.
AERATION IN AQUEDUCTS.

No. 360,593. Patented Apr. 5, 1887.

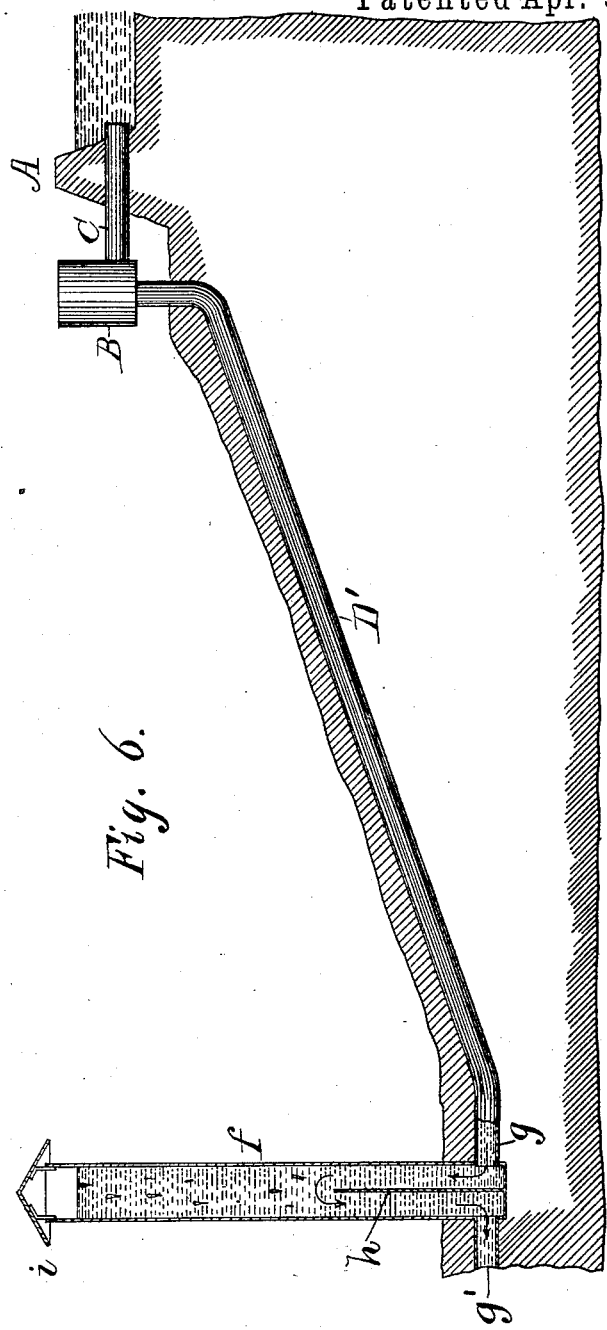

UNITED STATES PATENT OFFICE.

JOHN W. HYATT, OF NEWARK, NEW JERSEY.

AERATION IN AQUEDUCTS.

SPECIFICATION forming part of Letters Patent No. 360,593, dated April 5, 1887.

Application filed April 28, 1886. Serial No. 200,407. (No model.)

*To all whom it may concern:*

Be it known that I, JOHN W. HYATT, a citizen of the United States, residing at Newark, Essex county, New Jersey, have invented certain new and useful Improvements in Aeration in Aqueducts, fully described and represented in the following specification and the accompanying drawings, forming a part of the same.

This invention relates to a means for automatically mingling air with the contents of an aqueduct-conduit without materially diminishing the head of water in the same, and is intended as a substitute for the devices shown in my previous patents, Nos. 322,104 and 326,221, and in which the water was aerated while falling through a given distance, and therefore at the sacrifice of some part of its elevation.

My present improvement is partly adapted for aerating the water-supply of cities at the point where it is drawn from an elevated reservoir, and is based upon the principle that the contraction of a descending fluid vein in a vertical conduit tends to produce a partial vacuum therein, and that air will be drawn into the current at the surface of the water if the mouth of the conduit be maintained parallel with such surface and at a suitable distance below the same. Such vacuum in the pipe cannot, of course, be maintained without a continuous current—such as is produced by the continuous consumption of water—in the main conduits of city aqueducts. The influx of the air is, however, in conjunction with such vacuum, materially promoted by sustaining the mouth of the conduit at such a distance below the surface of the water that the flow of water thereto will not absolutely fill the pipe, and air will thereby be drawn in to supply the deficiency. The air, being carried along in the conduit by the current of water, is finally subjected to the same pressure as the head of water produces upon the liquid itself, and the air is thus subjected to the very conditions which it has been found in practice lead to its most effective solution and absorption by the water.

My invention, therefore, consists, primarily, in an outlet-pipe having its mouth sustained at a suitable distance below the horizontal surface of the water; secondly, in means for automatically sustaining it at such point during any variations of level in the surface of the water, and, thirdly, in means for adjusting the mouth of the outlet-pipe in relation to the surface of the water when desired.

It also consists in an outlet-pipe having a bell-mouth sustained horizontally below the surface of the water in a tank for containing the float and outlet-pipe, and in a means for registering the volume of air conveyed into the water.

Two different means of carrying out my invention are shown herein; but I do not limit myself to the particular construction described, as others may be devised to operate in substantially the same manner.

Figure 2:
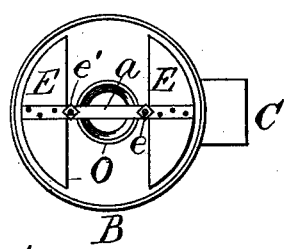
Figure 3:
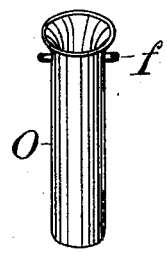
Figure 4:
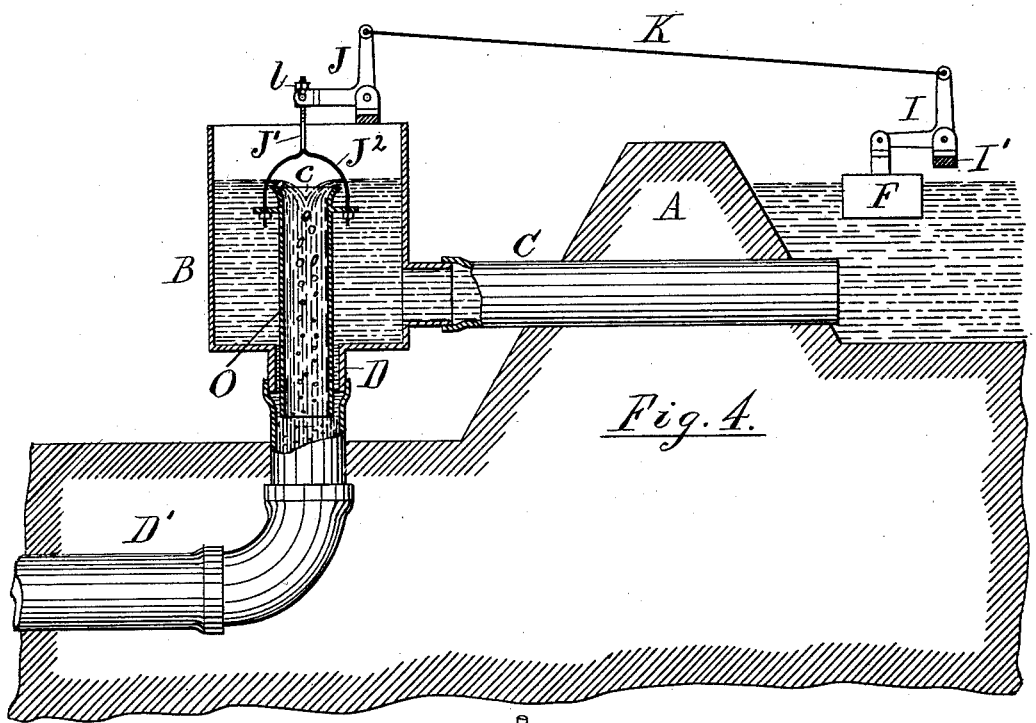
Figure 5:
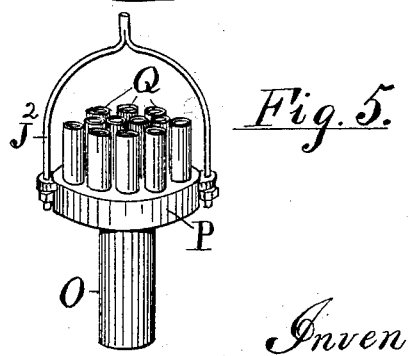

In the annexed drawings, Figure 1 is a vertical section of a reservoir having my improvements applied to its discharging-conduit, the latter being conducted through a receiving-tank in which a vertical pipe is sustained with its mouth below the surface of the water, the parts being shown in section where hatched. Fig. 2 is a plan of the tank, taken in section on line $x$ $x$ in Fig. 1. Fig. 3 is a detached view of the outlet-pipe in perspective; and Fig. 4 is a view similar to Fig. 1, showing an alternative construction and arrangement for the float. Fig. 5 represents in perspective an alternative construction for the outlet-pipe; and Fig. 6 represents, partly in section where hatched, a side elevation of a device for discharging any excess of air from the water-conduit.

A is the embankment of the reservoir; B, a tank constructed to maintain a float at the level of the water in the reservoir when the same varies at different periods; C, an outlet-pipe from the reservoir to the tank; D, a vertical outlet or conduit from the latter to the distributing-main D'; O, the aerating-pipe having its mouth sustained below the level of the water; E E, a pair of segmental floats arranged at each side of the pipe O and united above the water by a tie-bar, $a$.

$e$ are suspension-rods, passed through such bar and connected with lugs F upon the sides of the pipe O, and $e'$ are nuts upon such rods to adjust the pipe vertically in relation to the floats, and to thereby adjust its mouth at the desired distance below the surface of the water.

The tank is shown of circular form, and the floats upon their outer sides fit the same approximately, so as to sustain the pipe O in the center of the outlet D. The segmental form of the floats secures a space between them wider than the mouth of the pipe and permits the access of the water to the same with sufficient freedom upon all sides. The pipe fits loosely in the outlet D, so as to rise and fall freely with the floats, and its mouth is thus maintained in the same relation to the surface of the water whatever the level of the latter.

The pipe C is placed at the lowest point from which it is desired to deliver the water in the reservoir, and the apparatus within the tank is thus adapted to operate continuously during all the fluctuations of the water-level, the water entering the tank from the reservoir at one side and rising upward to enter the top of the pipe O. The pipe is preferably formed with a bell-mouth, as shown in the drawings, to facilitate the flow of the water therein and to prevent the formation of opposing currents over the same. The water then naturally forms a vortex within the mouth of the pipe, as at $c$ in Fig. 4, into which the air is drawn and mingled with the water, as shown by the descending bubbles in Figs. 1 and 2. By adjusting the mouth of the pipe at the proper distance below the surface of the water, the right proportion of air may be drawn in, and when such proportion is secured the adjustment of the pipe is automatically maintained by the action of the floats, and the air is wholly absorbed and dissolved by the water before its distribution to the service-pipes. To indicate the amount of air thus drawn into the water the top of the tank may be closed by a cover, G, and man-hole H, and the air be admitted through a pipe, $b$, and meter $d$, the dial of which would register the volume of air absorbed.

The alternate construction in Fig. 4 shows how the float may be applied to the surface of the water within the reservoir and operate effectively to maintain the mouth of the pipe O in a uniform relation to the level of the water in the tank. In this construction F is the float, connected with a bell-crank, I, which is pivoted upon a stationary beam, I', over the reservoir, and a similar bell-crank, J, is pivoted upon the top of the tank and connected by a suspension-rod, J', and bail J² with the top of the pipe O. A connection, K, which may be formed by a rope, chain, or bar, between the two bell-cranks serves to move them in unison and to lift the pipe O the same amount that the float F is elevated. As the level of the water in the tank obviously varies to the same degree as that in the reservoir, such a connection with the float F secures the automatic adjustment of the pipe in the desired manner. The rod J' is provided with a nut, $l$, at its upper end, by which the pipe may be adjusted vertically and its mouth be set at the desired distance below the surface of the water. It is obvious that the pipe may be so elevated that only a thin film of water would flow into it around the margin of its upper end, and that by gradually lowering the pipe such film may be increased in thickness until the entering current is nearly sufficient to fill its bore, thus creating positively a vortex in in the center, wherein the air will be drawn in the desired manner.

The alternative construction in Fig. 5 shows a means of subdividing the water-current as it enters the aerating-pipe, and consists in the combination, with the head of such pipe, of a hollow chamber, P, provided with a series of vertical nozzles, Q. The water entering such a number of small pipes would form an equal number of vortices, and would operate more efficiently to draw in the air than if a large pipe of their combined area were used, and the admixture of the air and water in the chamber P serves a valuable purpose also in mingling the two elements together before they enter the conduit D'.

It is obvious that where the water-level is kept uniform the pipe which forms the inlet to the conduit may be constructed and maintained at a suitable distance to draw the air in as desired without employing a movable pipe or mouth, as shown herein, and I do not, therefore, limit myself to the use of a movable pipe in connection with the inlet to the conduit.

As an erroneous adjustment of the aerating-pipe might cause the mixture of more air with the water than could be properly absorbed, I have devised a means of discharging such excess of air from the water automatically without the use of any valve mechanism or floats, such as have been sometimes used heretofore. Such discharge of air is preferably effected at the lowest point in the conduit before the water is distributed for consumption, thereby securing the greatest degree of compression and consequent absorption of the air by the water and avoiding the introduction of air into small service-pipes, where it might interfere with the flow of the water.

The device consists, as shown in Fig. 6, in a water-tower, $f$, opening at the top and connected by separate openings at the bottom with an inlet, $g$, and outlet $g'$ of the conduit-pipe D'. The inlet-pipe may be bent upward within the tower, or a partition, as shown at $h$, may be inserted in the bottom of the tower between the two openings to cause an upward circulation of the water therein, and the top of the tower is extended above the level of the reservoir, so that the water may be entirely relieved from compression and any excess of air contained therein may escape freely.

A cap, $i$, is shown supported just above the top of the tower to exclude rain without preventing the escape of the air.

The tower needs only to have an internal capacity twice the size of the conduit-pipe, that the water-current may flow upward and downward beside the partition $h$ without hinderance, and the tower may be protected from frost, if required, in any suitable manner.

I am aware that the outlet-pipe from a reservoir has been arranged below the surface of the water, and do not, therefore, claim such a construction, broadly; but I am not aware that the mouth of any outlet-pipe or the inlet of any conduit has been adjusted, as I have claimed herein, to induce a current of air into the pipe with the water for the purpose set forth.

Having thus set forth the nature and objects of my invention, what I claim herein is—

1. The means for aerating water, consisting in the combination, with the inlet of the water-conduit, of a pipe applied to said inlet and having a mouth so adjusted below the surface of the water entering said conduit as to induce a current of air into the pipe or conduit with the water, substantially in the manner described.

2. The means for aerating water on its passage from a reservoir to a distributing-conduit, consisting in the combination, with the conduit, of a pipe applied to its inlet and having its mouth sustained adjustably below the surface of the water at a suitable distance to induce a current of air into the pipe with the water, substantially as herein set forth.

3. The means for aerating water, consisting in the combination, with the water-conduit, of a pipe applied to the inlet of the conduit and having a mouth sustained below the surface of the water by a buoyant body or float, the pipe being adjusted to induce a current of air into the pipe with the water, substantially as shown and described.

4. The means for aerating water, consisting in the combination, with the water-conduit, of a pipe applied to the inlet of the conduit and having a horizontal mouth sustained below the surface of the water by an adjustable connection to a buoyant body or float, the mouth of the pipe being adjusted to induce a current of air into the pipe with the water, substantially as herein set forth.

5. The means for aerating water, consisting in the combination, with a reservoir, of a water-tank having an inlet from such reservoir and a vertical outlet in its bottom, and a vertical pipe fitted movably with said outlet and having its mouth sustained below the surface of the water in the tank, as and for the purpose set forth.

6. The means for aerating water, consisting in the combination, with a reservoir, of a water-tank having an inlet from such reservoir and a vertical outlet in its bottom, a vertical pipe fitted movably within said outlet, a float resting upon the water within said tank, and adjustable means connected with the float for supporting the mouth of the pipe a suitable distance below the water to induce a current of air into the pipe with the water, substantially as shown and described.

7. The means for aerating water, consisting in a closed tank, a water-supply pipe thereto, and a vertical outlet in its bottom, a vertical pipe fitted movably in said outlet, a float, and an adjustable connection for sustaining the mouth of the pipe below the level of the water, the mouth of the pipe being adjusted to induce a current of air into the pipe with the water, an air-pipe leading to such tank, and a meter for registering the passage of air, the whole arranged and operated as and for the purpose set forth.

8. The means for aerating water, consisting in a tank, a water-supply pipe thereto, and a vertical outlet in its bottom, a vertical pipe fitted movably in said outlet, a float, and an adjustable connection for sustaining the mouth of the pipe below the level of the water at a suitable distance to induce a current of air into the pipe with the water, as and for the purpose set forth.

9. The means for aerating water, consisting in the combination, with the water-conduit, of a pipe applied to the inlet of the conduit and having a bell-shaped mouth sustained horizontally at a suitable distance below the surface of the water to induce a current of air into the pipe with the water, as and for the purpose set forth.

10. The means for aerating water on its passage from a reservoir to a distributing-conduit, consisting in the combination, with the conduit, of a pipe applied to its inlet, the pipe being formed with the hollow chamber P and provided with a series of vertical nozzles, Q, and the nozzles having their mouths sustained adjustably below the surface of the water at a suitable distance to induce a current of air into the pipe with the water, substantially as herein set forth.

In testimony whereof I have hereunto set my hand in the presence of two subscribing witnesses.

JOHN W. HYATT.

Witnesses:
 CHAS. C. MCBRIDE,
 THOS. S. CRANE.